2,797,250

STABILIZATION OF CHLORINATED HYDROCARBONS

Harry B. Copelin, Niagara Falls, N. Y., assignor to E. I. du Pont de Nemours and Company, Wilmington, Del., a corporation of Delaware No Drawing. Application May 13, 1954, Serial No. 429,675

11 Claims. (Cl. 260—652.5)

This invention relates to chlorinated hydrocarbons. More particularly it relates to preventing the generation of acidity in trichlorethylene and perchlorethylene. In one aspect, the invention is concerned with the process for preventing the accumulation of acid in these chlorinated hydrocarbons. In another aspect it is concerned with chlorinated hydrocarbons containing various additives to repress this acid accumulation.

BACKGROUND OF THE INVENTION

Chlorinated hydrocarbons today find many uses in industry. Trichlorethylene and perchlorethylene, for example, are particularly valuable for accomplishing the vapor degreasing of metals. These compounds are somewhat unstable, however, and undergo reactions with air and the metals they contact yielding products such as hydrogen chloride which seriously impair their utility. Heretofore small quantities of addition agents have been added to stabilize the chlorinated hydrocarbons or to neutralize the products formed. Particularly valuable as addition agents are antacids such as the basic amines, commonly used to maintain alkaline conditions in the chlorinated hydrocarbon.

The present invention is concerned primarily with addition agents serving as antacids. Generation of hydrogen chloride and concomitant acidification of the chlorinated hydrocarbons constitutes one of the major problems when these materials are employed, particularly in vapor degreasing. Hydrogen chloride may result from air oxidation of the hydrocarbon or from the decomposition of the chlorinated cutting oils frequently removed from metallic work-pieces by degreasing. When present in even small quantities, hydrogen chloride corrodes the degreaser and catalyzes the rusting of iron or steel workpieces put through the machine. When metallic aluminum is treated in the presence of the acid, aluminum chloride will generally be formed. This salt is a catalyst for the decomposition of the solvent and may be so effective that the unit must be shut down and the solvent neutralized.

As noted above, amines, such as pyridine, are frequently added to the solvent as antacids since they combine with free acid and tend to maintain a high pH in the solvent. U. S. P. 2,096,735, among others, discloses the utility of these compounds as acid acceptors. This patent teaches that in vapor degreasing operations employing trichlorethylene or perchlorethylene as solvents, a basic amine which is suitable for neutralizing acid (HCl) and maintaining an alkaline condition is soluble in the solvent, will react with HCl to form the hydrochloride and whose boiling point is sufficiently close to that of the solvent to insure vaporization of the amine concurrently with the boiling of the solvent, whereby the amine is effective as an antacid both in the liquid and vapor phases. This patent shows that around 0.25% by weight of amine may be used but, in addition, that much higher amounts, i. e. up to 5%, are also acceptable.

In practice the quantity employed is limited both by economic considerations and by the fact that a high amine content adversely affects the zinc coatings used in many degreasers. An excess of amine may, furthermore, etch aluminum, remove hydrogen chloride from the solvent molecules and, because of its toxicity, raise a serious health problem. As a consequence, the quantity of amine which may be employed is frequently too limited to absorb the hydrogen chloride produced. This situation particularly arises when aluminum chips or fines are present in the degreasers.

OBJECTS OF THE INVENTION

An object of this invention is, therefore, to provide a new and improved method of stabilizing chlorinated hydrocarbons, trichlorethylene in particular.

Another object of the invention is to provide an improved method of stabilizing trichlorethylene with an amine.

Still another object of the invention is to provide a method for removing free acid from trichlorethylene employing smaller quantities of amine than have heretofore been considered practicable.

A further object is to provide a method of stabilizing trichlorethylene against the generation of hydrogen chloride therein.

GENERAL STATEMENT OF INVENTION

The above-mentioned and still further objects may be achieved in accordance with the principles of this invention by supplying a synergist to a chlorinated hydrocarbon containing an amine. Effective synergists for such usage are the organic oxides termed epoxides. These compounds cooperate with the amine to impart thereto a marked increase in effectiveness as an acid acceptor. Since the epoxide itself is a relatively poor acid acceptor when utilized alone, its performance when used in combination with the amine is particularly surprising.

The epoxides of this invention are in general organic oxides having the configuration:

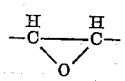

The preferred compounds are those having relatively short aliphatic carbon chains, e. g. up to about eight carbon atoms in length. Suitable expoxides include propylene oxide, butylene oxide, amylene oxide, cyclohexene oxide and others. Halogen substituents in the carbon chain are perfectly acceptable, epichlorohydrin or chloropropylene oxide, for example, yielding excellent results.

The quantity of epoxide employed for synergistic results with an amine is still small but is generally at least about five or ten times the weight of the amine and may be much greater. Usually 0.01–0.5% by weight of the epoxide is suitable but up to 5% may be used if desired. It may be noted that these compounds, although not as effective in neutralizing acids as the amine, do not exhibit the undesirable properties of the latter listed above and can thus be used in greater quantity without danger. In addition, they are usually cheaper.

The amines aided by the oxides are the basic amines conventionally employed in degreasing operations. Amines containing nitrogen in an organic ring, such as basic pyridines and picolines, are quite suitable as are straight chain amines such as triethylamine. The quantity of amine employed may comprise about 0.001–0.01% of the solvent or even more if the various disadvantages of the compounds can be tolerated. Generally it will be unnecessary to use more than 0.1–0.2% of the amine.

EXAMPLES

The invention may be understood in more detail from the following examples, in which all percentages are by weight unless otherwise noted. Each pH given was determined from an aqueous extract of the sample concerned. Data on aqueous extracts recorded within a given example were taken on samples of equal volume.

Example 1

This example shows the use of a synergistic amine-epoxide combination additive as an acid acceptor during storage of a chlorinated hydrocarbon.

A series of three samples of trichlorethylene was prepared, sealed and allowed to stand in a colorless glass container for one week, each sample being subjected to the same ambient conditions, including ordinary room temperature. The composition of the samples and the effectiveness of the additives utilized are shown in Table I.

TABLE I.—EFFECT OF SELECTED ADDITIVES ON TRICHLORETHYLENE UNDER STORAGE CONDITIONS

| Sample | Additive | Initial pH of Sample | pH of Sample at End of Seven Days |
|---|---|---|---|
| 1 | 0.001% Triethylamine | ca. 9.2 | 8.5 |
| 2 | 0.2% Butylene oxide | ca. 7.0 | 3.3 |
| 3 | 0.001% Triethylamine+0.2% Butylene oxide | ca. 9.2 | 9.1 |

Example 2

This example shows the effect of a synergistic butylene-oxide-triethylamine combination additive upon a refluxed chlorinated hydrocarbon.

Samples of trichlorethylene were made up and refluxed for 24 hours at ambient pressure. The samples were then extracted with water and the pH of the extracts obtained. The composition of the samples and the results obtained are given in Table II.

TABLE II.—EFFECT OF SYNERGISTIC BUTYLENE OXIDE-ADDITIVES ON REFLUXED TRICHLORETHYLENE

| Sample | Additive | pH at End of 24 Hours Reflux |
|---|---|---|
| 4 | 0.001% Triethylamine | 4.2 |
| 5 | 0.2% Butylene oxide | 2.1 |
| 6 | 0.001% Triethylamine+0.2% Butylene oxide | 6.8 |

The initial pH's of the samples were the same as for the corresponding samples of Example 1.

It will be noted that while the samples containing single additives had become noticeably acidic at the end of 24 hours' reflux, that containing two in combination remained close to neutrality. A marked synergistic effect is thus obtained under reflux conditions.

Example 3

This example affords another illustration of synergism between triethylamine and butylene oxide.

Samples were made up with the same ingredients as the samples of Example 2 and refluxed for 425 hours. Results are shown in Table III.

TABLE III.—REFLUX OF TRIETHYLAMINE-BUTYLENE OXIDE SAMPLES FOR 425 HOURS

| Sample | Additive | Initial pH | Final pH |
|---|---|---|---|
| 7 | 0.1% Triethylamine | 10.5 | 3.0 |
| 8 | 0.4% Butylene oxide | 7.0 | <4.5 |
| 9 | 0.05% Triethylamine+0.2% Butylene oxide | 10.2 | 10.0 |

Example 4

This example shows synergism between triethylamine and cyclohexene oxide.

Samples of trichlorethylene were made up and refluxed for 200 hours. Composition of the samples and results are shown in Table IV.

TABLE IV.—REFLUX OF TRIETHYLAMINE-CYCLOHEXENE OXIDE SAMPLES FOR 200 HOURS

| Sample | Additive | Initial pH | Final pH |
|---|---|---|---|
| 10 | 0.02% Triethylamine | 10.0 | 3.9 |
| 11 | 0.25% Cyclohexene oxide | 7.0 | 1.6 |
| 12 | 0.01% Triethylamine+0.12% Cyclohexene oxide | 9.8 | 9.3 |

Example 5

This example shows the effect of the synergistic additive upon refluxed trichlorethylene samples containing iron powder, i. e. under conditons simulating those found in degreasers for ferrous materials.

Three samples were made up each containing 300 g. of trichlorethylene and 1 g. of iron powder. In each sample was placed an additive and the samples were then refluxed. At the end of 16 hours and again after 32 hours the samples were extracted with equal volumes of water and the pH of the water extracts measured. The additives and pH's are shown in Table V.

TABLE V.—EFFECT OF ADDITIVES ON SAMPLES OF TRICHLORETHYLENE CONTAINING IRON

| Sample | Additive | pH—16 Hrs. Reflux | pH—32 Hrs. Reflux |
|---|---|---|---|
| 13 | 0.03 g. Triethylamine | 4.6 | 3.5 |
| 14 | 0.6 g. Butylene oxide | 1.8 | 1.7 |
| 15 | 0.03 g. Triethylamine+0.6 g. Butylene oxide | 8.6 | 7.0 |

It will be seen that the combination of additives remained effective after 32 hours' reflux.

Example 6

This example shows the effect of an additive composed of β-picoline and epichlorhydrin.

A series of three samples of trichlorethylene was protected respectively by β-picoline, epichlorhydrin (chloropropylene axide) and a synergistic combination of the two. The samples were refluxed and extracted with water, as in previous tests, at the end of 24 and 48 hours. Table VI shows the results obtained with these runs.

TABLE VI.—EFFECT OF β-PICOLINE AND EPICHLORHYDRIN-ADDITIVES

| Sample | Additive | pH—24 Hrs. Reflux | pH—48 Hrs. Reflux |
|---|---|---|---|
| 16 | 0.1% β-picoline | 7.0 | 6.5 |
| 17 | 0.5% Epichlorhydrin | 3.5 | (1) |
| 18 | 0.1% β-picoline+0.5% Epichlorhydrin | 8.1 | 7.7 |

1 Not tested. Too acidic after 24 hours to be of value.

Example 7

This example shows the effect of a synergistic additive, compounded in accordance with the principles of this invention, used in the presence of a cutting oil of a type that may be present in a degreaser.

A series of runs was made with 300 g. samples of trichlorethylene containing 30 g. "Clorafin" 40 cutting oil and pyridine and epichlorhydrin additives separately and combined. The samples are refluxed for 24 hours. Results are tabulated in Table VII.

TABLE VII.—EFFECT OF PYRIDINE AND EPICHLORHYDRIN ADDITIVES ON CUTTING OIL MIXTURES

| Sample | Additive | pH—24 Hrs. Reflux |
|---|---|---|
| 19 | 0.3 g. Pyridine | 5.5 |
| 20 | 0.6 g. Epichlorhydrin | 2.5 |
| 21 | 0.3 g. Pyridine+0.6 g. Epichlorhydrin | 7.0 |

The term "cutting oils" found throughout this specification refers to oily liquids used in metal working to lubricate the metal work-piece. Trichlorethylene is widely employed to remove the cutting oil when a metallic working step is concluded. "Clorafin" 40 is a proprietary name for a chlorinated oil suitable as a cutting oil.

Example 8

This is a substantial repetition of Example 7.

A series of samples was made up, each consisting of 250 g. trichlorethylene and 100 g. "Clorafin" 40 oil. To different samples were added different additives and the mixtures then refluxed for 24 hours. Results are shown in Table VIII.

TABLE VIII.—EFFECT OF ADDITIONAL SYNERGISTIC ADDITIVES ON CUTTING OIL MIXTURES

| Sample | Additive | pH—24 Hrs. |
|---|---|---|
| 22 | None | 3.9 |
| 23 | 0.2% Butylene oxide | 3.9 |
| 24 | 0.01% Aniline | 3.7 |
| 25 | 0.2% Butylene oxide+0.01% Aniline | 5.0 |
| 26 | 0.01% Pyridine | 5.2 |
| 27 | 0.2% Butylene oxide+0.01% Pyridine | 6.2 |

Run 25 clearly shows the synergism obtained by combining the additives of runs 23 and 24 while run 27 shows that obtained by combining the additives of runs 23 and 26.

Example 9

This example shows the effects of diisopropylamine and cyclohexene oxide additives.

Trichlorethylene samples were made up containing diisopropylamine, cyclohexene oxide and a mixture of these two compounds respectively. The samples were then refluxed as in preceding runs. Results are set forth in Table IX.

TABLE IX.—EFFECT OF DIISOPROPYLAMINE AND CYCLOHEXENE OXIDE ADDITIVES

| Sample | Additive | pH—200 Hrs. | pH—300 Hrs. |
|---|---|---|---|
| 28 | 0.003% Diisopropylamine | 7.5 | 6.3 |
| 29 | 0.2% Cyclohexene oxide | ¹2.0 | (¹) |
| 30 | 0.003% Diisopropylamine + 0.2% Cyclohexene oxide | 9.8 | 9.8 |

¹ Reflux of the sample containing the oxide alone was actually discontinued at the end of 120 hours.

Example 10

This example shows the effects of diisopropylamine and butylene oxide additives.

Trichlorethylene samples were made up containing diisopropylamine, butylene oxide and a mixture of these two. Reflux was then carried out at ambient pressure for 50 hours. The data obtained are given in Table X. The trichlorethylene used here was of low quality and hence possessed an increased tendency to liberate acid on reflux.

TABLE X.—REFLUX OF DIISOPROPYLAMINE AND BUTYLENE OXIDE FOR 50 HOURS

| Sample | Additive | Initial pH | Final pH |
|---|---|---|---|
| 31 | 0.01% Diisopropylamine | 9.5 | <4.5 |
| 32 | 0.2% Butylene oxide | 7.0 | <4.5 |
| 33 | 0.005% Diisopropylamine + 0.1% Butylene oxide | 9.2 | 7.0 |

CONCLUSION

The data of the foregoing examples, as for instance as set forth in Table IX, clearly show: (1) that extremely small quantities of amine are effective antacids when employed synergistically with an epoxide and (2) that the ratio of epoxide to amine in such synergistic antacid pairs may be very large. The epoxide:amine ratio in sample 30 is, for instance, 150:1 but may be even larger if desired. A possible explanation for these results lies in the cyclic process represented by the following partial equations:

(1) Amine+HCl→amine·HCl

and (2) Amine·HCl+epoxide→Chlorohydrin+amine

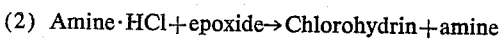

In effect neutral epoxide usable in large quantities is consumed while the toxic and expensive amine is constantly regenerated.

It may be noted that the amine-epoxide synergism of this invention is not appreciably affected by certain other additives included in the trichlorethylene. Thus, for example, N-methyl pyrrole and ethyl acetate, known preservatives for chlorinated hydrocarbons, can be included along with an amine and an epoxide in a single sample of the solvent.

Other variations in the exemplified aspects of this invention can be made without departing from the spirit thereof. More than one amine can, for example, be used in the same sample of chlorinated hydrocarbon together with a single oxide. Alternatively, two oxides can be combined with one amine or even with two or more amines. Since no particular advantage accrues from such complex combinations, they are not preferred.

Having now described my invention, I claim:

1. The method of stabilizing trichlorethylene against the formation of acidic products therein which comprises supplying thereto about 0.001–0.2% by weight of a first additive from the group consisting of triethylamine, β-picoline, diisopropylamine, pyridine and aniline and a second additive, synergistically cooperative with the first, from the group consisting of butylene oxide, epochlorhydrin and cyclohexene oxide.

2. The method of claim 1 in which the amine is triethylamine and the epoxide is butylene oxide.

3. The method of claim 1 in which the first additive is triethylamine and the second additive is epichlorhydrin.

4. A composition of matter comprising a chlorinated hydrocarbon degreasing solvent containing about 0.001 to 0.2% by weight of a basic amine which (1) is soluble in said solvent, (2) volatilizes with the solvent when the latter boils and (3) reacts with HCl to form a salt thereof and further contains in solution in said solvent an epoxide capable of reacting with the hydrochloride of said amine to form a chlorohydrin.

5. The composition of claim 4 in which the basic amine is present in amount equivalent to 0.001 to 0.2% by weight of the chlorinated hydrocarbon degreasing solvent and the epoxide in amount equivalent to 0.01 to 5% by weight of said solvent.

6. A composition of matter comprising a chlorinated hydrocarbon degreasing solvent carrying about 0.001–0.2% by weight of a first additive from the group consisting of triethylamine, β-picoline, diisopropylamine, pyridine and aniline and about 0.01–5% by weight of a second additive from the group consisting of butylene oxide, epichlorhydrin and cyclohexene oxide, the second additive being synergistically cooperative with the first to stabilize the chlorinated hydrocarbon against the formation therein of acidic products.

7. The composition of claim 6 in which the chlorinated hydrocarbon is trichlorethylene.

8. The composition of claim 7 in which the first additive is triethylamine and the second additive is butylene oxide.

9. The composition of claim 7 in which the first additive is triethylamine and the second additive is epichlorhydrin.

10. The composition of claim 6 in which the chlorinated hydrocarbon degreasing solvent is perchlorethylene.

11. The composition of claim 10 in which the first additive is diisopropylamine and the second additive is cyclohexene oxide.

References Cited in the file of this patent

UNITED STATES PATENTS

| | | |
|---|---|---|
| 2,094,367 | Missbach | Sept. 28, 1937 |
| 2,364,588 | Morris et al. | Dec. 5, 1944 |
| 2,371,644 | Petering et al. | Mar. 20, 1945 |